United States Patent
Kinoshita

(10) Patent No.: US 9,434,365 B2
(45) Date of Patent: Sep. 6, 2016

(54) VEHICLE BRAKE HYDRAULIC PRESSURE CONTROLLER

(71) Applicant: NISSIN KOGYO CO., LTD., Ueda, Nagano (JP)

(72) Inventor: Takashi Kinoshita, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/300,672

(22) Filed: Jun. 10, 2014

(65) Prior Publication Data
US 2014/0372004 A1    Dec. 18, 2014

(30) Foreign Application Priority Data
Jun. 12, 2013  (JP) ................... 2013-124085

(51) Int. Cl.
*B60W 10/18*      (2012.01)
*B60T 7/04*       (2006.01)
(Continued)

(52) U.S. Cl.
CPC ............. *B60T 8/245* (2013.01); *B60T 7/042* (2013.01); *B60T 7/122* (2013.01); *B60T 8/4081* (2013.01);
(Continued)

(58) Field of Classification Search
CPC .. B60T 8/172; B60T 13/745; B60T 8/17554; B60T 2201/06; B60T 13/686; B60T 8/00; B60W 10/184; B60W 30/02; B60W 30/18118; B60W 2520/105; B60W 2720/106; B60W 2720/30; B60L 2240/423; F16D 2500/50825; F16D 48/06
See application file for complete search history.

(56) References Cited

U.S. PATENT DOCUMENTS 5,070,460 A * 12/1991 Yasuno ........................ 701/78
6,068,576 A *  5/2000 Tsutsui et al. .............. 477/144
(Continued)

FOREIGN PATENT DOCUMENTS

DE   102011017528 A1   10/2012
JP       2006312378    11/2006
(Continued)

OTHER PUBLICATIONS

European Search Report for Related EP Application No. 14171928.6, dated Oct. 24, 2014, 6pages.
(Continued)

*Primary Examiner* — Jerrah Edwards
*Assistant Examiner* — Demetra Smith-Stewart
(74) *Attorney, Agent, or Firm* — Andrew M. Calderon; Roberts Mlotkowski Safran Cole & Calderon, P.C.

(57) ABSTRACT

There is provided a hydraulic pressure controller to be mounted on a vehicle which is configured so that a driving torque transmitted to wheels during a stop of the vehicle reduces. The hydraulic pressure controller includes a vehicle holding controller configured to carry out a vehicle holding control to hold a brake hydraulic pressure applied to the wheels during the stop of vehicle stop. In the case that an actual-pressure-equivalent hydraulic pressure corresponding to a brake hydraulic pressure actually applied to the wheels is not more than a predetermined hydraulic pressure at a start time of the vehicle holding control, the vehicle holding controller sets a pressurization target pressure using a specific driving torque applied at the start time of the vehicle holding control and carries out a pressurization control to raise the brake hydraulic pressure to the pressurization target pressure.

20 Claims, 9 Drawing Sheets

(51) Int. Cl.
  *B60T 8/40* (2006.01)
  *B60T 13/66* (2006.01)
  *B60T 13/68* (2006.01)
  *B60T 8/24* (2006.01)
  *B60T 7/12* (2006.01)
  *B60T 13/14* (2006.01)
  *B60T 13/74* (2006.01)
  *B60W 30/18* (2012.01)
  *B60T 8/00* (2006.01)
  *B60T 13/58* (2006.01)

(52) U.S. Cl.
  CPC ............ *B60T 13/146* (2013.01); *B60T 13/662* (2013.01); *B60T 13/745* (2013.01); *B60W 30/18118* (2013.01); *B60T 8/00* (2013.01); *B60T 13/588* (2013.01); *B60T 13/66* (2013.01); *B60T 13/686* (2013.01); *B60T 2201/06* (2013.01)

(56) References Cited

U.S. PATENT DOCUMENTS

| | | | | |
|---|---|---|---|---|
| 6,913,326 | B1* | 7/2005 | Ohkubo et al. | 303/11 |
| 7,512,474 | B2* | 3/2009 | Tabata et al. | 701/91 |
| 8,182,049 | B2* | 5/2012 | Kurosaki et al. | 303/155 |
| 8,417,429 | B2* | 4/2013 | Sekiya | B60T 8/17636 303/113.1 |
| 8,764,124 | B2* | 7/2014 | Furuyama | 303/9.75 |
| 8,897,944 | B2* | 11/2014 | Takamura et al. | 701/22 |
| 9,045,119 | B2 | 6/2015 | Burkert et al. | |
| 2009/0021072 | A1* | 1/2009 | Kobayashi | B60T 8/17636 303/163 |
| 2010/0048352 | A1* | 2/2010 | Yamamoto | B60T 7/085 477/92 |
| 2010/0138123 | A1 | 6/2010 | Tokimasa et al. | |
| 2011/0006591 | A1* | 1/2011 | Yoshii et al. | 303/4 |
| 2012/0109482 | A1* | 5/2012 | Yoshii | 701/70 |
| 2013/0192937 | A1* | 8/2013 | Furuyama | B60T 7/12 188/72.6 |
| 2013/0241275 | A1* | 9/2013 | Miyazaki et al. | 303/6.01 |

FOREIGN PATENT DOCUMENTS

| | | |
|---|---|---|
| JP | 2009190648 | 8/2009 |
| JP | 2012091603 | 5/2012 |
| JP | 2014511803 | 5/2014 |
| WO | WO-2012146443 | 11/2012 |

OTHER PUBLICATIONS

Japanese Office Action for related JP Application No. 2013-124085, dated Apr. 21, 2015, 4 pages.

* cited by examiner

CONTROL MODE

STABILIZATION FLAG

LONGITUDINAL ACCELERATION

VEHICLE STOP JUDGMENT

HYDRAULIC PRESSURE

DRIVING TORQUE

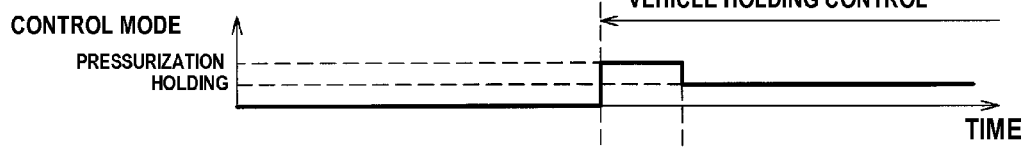
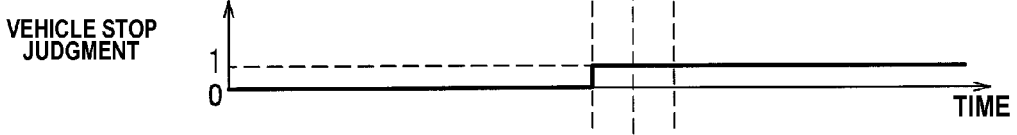
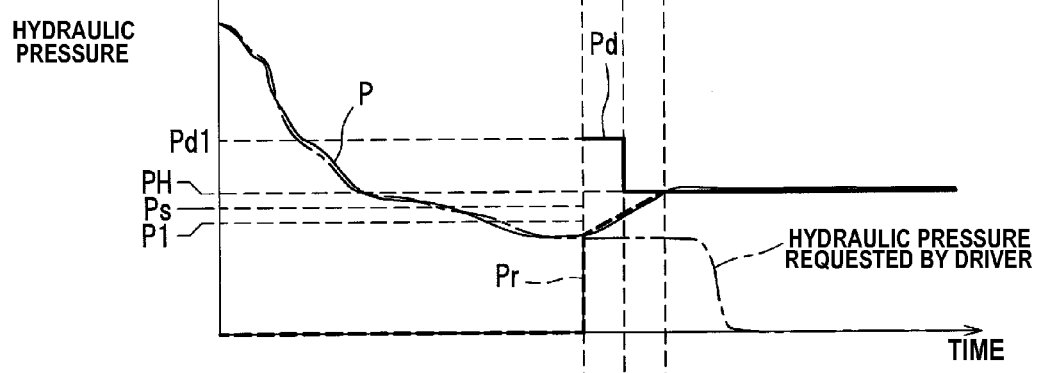
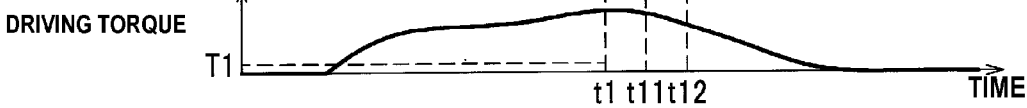

VEHICLE BRAKE HYDRAULIC PRESSURE CONTROLLER

CROSS-REFERENCE TO RELATED APPLICATION(S)

This application claims priority from Japanese Patent Application No. 2013-124085 filed on Jun. 12, 2013, the entire contents of which are incorporated herein by reference.

FIELD

Embodiments described herein generally relate to a vehicle brake hydraulic pressure controller.

BACKGROUND

For example, as a vehicle brake hydraulic pressure controller for holding brake hydraulic pressure so as to maintain the stop state of a vehicle, there is know a controller which calculates, as necessary, driving torque gradually decreasing after the stop time of the vehicle and then increases braking force depending on the decrease of the calculated driving torque (refer to JP-2006-312378-A).

However, in such technology, since the driving torque is calculated as necessary while vehicle holding control for maintaining the stop state of the vehicle is carried out, the control becomes complicated.

SUMMARY

One object of the present invention is to provide a vehicle brake hydraulic pressure controller capable of making vehicle holding control simple.

According to one aspect of the present invention, there is provided a vehicle brake hydraulic pressure controller to be mounted on a vehicle which is configured so that a driving torque transmitted to wheels during a stop of the vehicle reduces, the vehicle brake hydraulic pressure controller including: a vehicle holding controller configured to carry out a vehicle holding control to hold a brake hydraulic pressure applied to the wheels during the stop of vehicle stop, wherein, in the case that an actual-pressure-equivalent hydraulic pressure corresponding to a brake hydraulic pressure actually applied to the wheels is not more than a predetermined hydraulic pressure at a start time of the vehicle holding control, the vehicle holding controller sets a pressurization target pressure using a specific driving torque applied at the start time of the vehicle holding control and carries out a pressurization control to raise the brake hydraulic pressure to the pressurization target pressure.

With this configuration, the pressurization target pressure is set using the driving torque applied only at the start time of the vehicle holding control, whereby the vehicle holding control can be made simple.

There may be provided the vehicle brake hydraulic pressure controller further including: a road surface gradient estimator configured to estimate a road surface gradient, wherein the vehicle holding controller corrects the pressurization target pressure on the basis of the road surface gradient estimated by the road surface gradient estimator.

With this configuration, the pressurization target pressure suited for the road surface gradient can be set, whereby the vehicle can be held better.

There may be provided the vehicle brake hydraulic pressure controller, wherein the road surface gradient estimator estimates the road surface gradient on the basis of a longitudinal acceleration, and the vehicle holding controller corrects the pressurization target pressure under the condition that the longitudinal acceleration has been stabilized.

With this configuration, the road surface gradient can be calculated accurately using the stabilized longitudinal acceleration.

There may be provided the vehicle brake hydraulic pressure controller, wherein the vehicle holding controller calculates a vehicle stop optimum holding pressure at which the vehicle stops in a state of zero driving torque on the basis of the road surface gradient estimated by the road surface gradient estimator while the pressurization control is carried out and sets the pressurization target pressure to the actual-pressure-equivalent hydraulic pressure in the case that the actual-pressure-equivalent hydraulic pressure is larger than the vehicle stop optimum holding pressure.

With this configuration, in the case that the actual-pressure-equivalent hydraulic pressure is larger than the vehicle stop optimum holding pressure, that is, in the case that the actual-pressure-equivalent hydraulic pressure at the time is sufficient to be able to stop the vehicle, the pressurization target pressure is set to the actual-pressure-equivalent hydraulic pressure. With this setting, the pressurization control can be ended promptly, whereby the holding pressure can be suppressed from becoming excessively high.

There may be provided the vehicle brake hydraulic pressure controller, further including: a setting storage configured to store a minimum pressurization target pressure, wherein the vehicle holding controller sets the pressurization target pressure to the minimum pressurization target pressure in the case that the pressurization target pressure is smaller than the minimum pressurization target pressure.

With this configuration, in the case that the pressurization target pressure is smaller than the minimum pressurization target pressure, the pressurization target pressure is changed to the minimum pressurization target pressure that is larger than the pressurization target pressure. Hence, even in the case that, for example, the pressurization target pressure has been set to a very low value, the influence of disturbance (vibration or the like) can be suppressed by the minimum pressurization target pressure that is larger than the very low value, whereby the vehicle can be held better.

There may be provided the vehicle brake hydraulic pressure controller, wherein the vehicle holding controller raises the brake hydraulic pressure at a preset constant incremental gradient in the pressurization control.

With this configuration, since the brake hydraulic pressure is raised at the preset constant incremental gradient in the pressurization control, the influence of rolling-back (shock) to the vehicle at the time when the pressurization control is ended (when the pressurization control is switched to the holding control) is suppressed, and an excellent pressurization feeling can be obtained.

With the present invention, the vehicle holding control can be made simple.

BRIEF DESCRIPTION OF DRAWINGS

FIGS. 8A to 8F are time charts in Example 2 in which the pressurization target pressure is set to a vehicle stop optimum holding pressure after the stabilization of longitudinal acceleration.

DETAILED DESCRIPTION

An embodiment will be described referring to the accompanying drawings.

Figure 1:
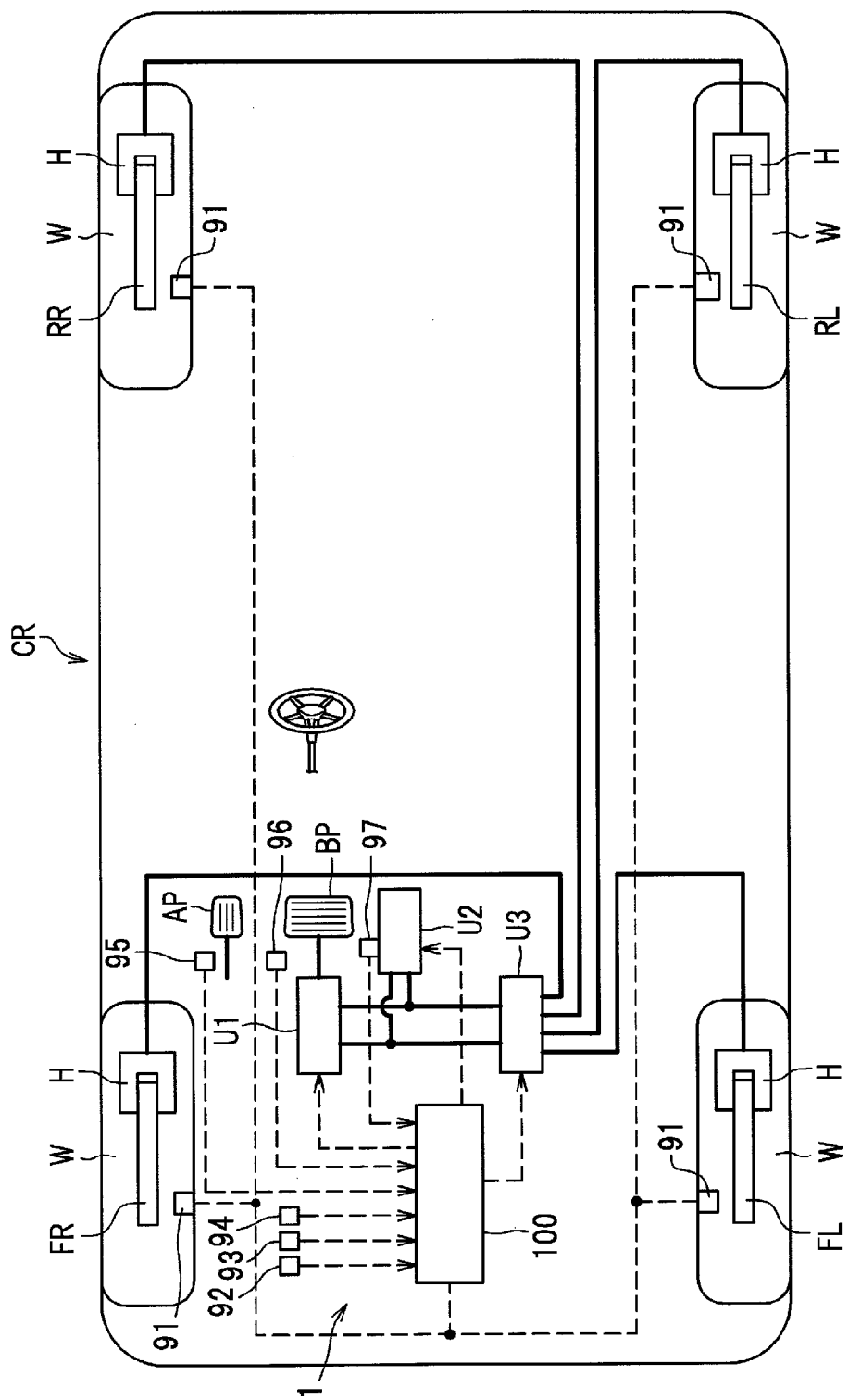
FIG. 1 is a view showing the configuration of a vehicle equipped with a controller used as an example of a vehicle brake hydraulic pressure controller according to an embodiment of the present invention.

A brake system 1, to which a controller 100 serving as a vehicle brake hydraulic pressure controller according to the present invention and shown in FIG. 1 is applied, is equipped with both a by-wire electric brake system for normal use in which the brake is operated through the transmission of electric signals and a hydraulic pressure brake system for fail-safe use in which the hydraulic pressure generated by the stepping force on a brake pedal BP is directly transmitted to operate the brake.

Hence, the brake system 1 is equipped with an input unit U1 to which the operation of the brake pedal BP is input when the brake pedal BP is operated by the driver; a motor cylinder unit U2 for generating brake hydraulic pressure depending on the operation amount of the brake pedal BP (hereafter also referred to as "brake operation amount") and depending on required control; and a hydraulic pressure control unit U3 for carrying out brake hydraulic pressure control to support the stabilization of vehicle behavior. Each of the input unit U1, the motor cylinder unit U2 and the hydraulic pressure control unit U3 is composed of two systems: a first system for controlling a right-front wheel brake FR and a left-rear wheel brake RL and a second system for controlling a left-front wheel brake FL and a right-rear wheel brake RR. The connections for the respective systems, including hydraulic pressure passages formed of pipe materials, such as hoses and tubes, are made independent of each other. In addition, the input unit U1 and the motor cylinder unit U2 are electrically connected to each other via a harness, not shown.

Although the brake system 1 can be mounted on various kinds of vehicles including automobiles driven only by an engine (internal combustion engine), hybrid automobiles, electric automobiles, fuel cell automobiles, etc., it is assumed in this embodiment that the brake system 1 is mounted on a hybrid automobile. The hybrid automobile according to this embodiment is configured so that idling stop in which the engine is temporarily stopped during the stop of a vehicle CR is carried out. In other words, the vehicle CR according to this embodiment is configured so that driving torque (creep torque) transmitted to the wheels during the stop of the vehicle is reduced. The vehicle CR according to this embodiment is configured so that the driving torque decreases as the brake operation amount increases in order that the concentration of electric loads on part of the drive circuit of the traveling motor of the vehicle due to the driving torque (creep torque) continuously generated by the traveling motor during the stop of the vehicle is suppressed.

For the control of vehicle behavior using the electric brake system and the hydraulic pressure control unit U3, the brake system 1 is equipped, at appropriate positions of the vehicle CR, with a wheel speed sensor 91, a steering angle sensor 92, a lateral acceleration sensor 93, a longitudinal acceleration sensor 94, an accelerator pedal stroke sensor 95 for detecting the stroke of an accelerator pedal AP, a brake pedal stroke sensor 96 for detecting the stroke of the brake pedal BP, and a motor rotation angle sensor 97. The output values of these sensors are output to the controller 100. The motor rotation angle sensor 97 is a sensor for detecting the rotation angle of an electric motor 42 (refer to FIG. 2) for driving the motor cylinder unit U2.

The controller 100 is equipped with, for example, a CPU, a RAM, a ROM and input/output circuits, performs various kinds of arithmetic processing on the basis of the output values of the above-mentioned respective sensors and the programs and data stored in the ROM, thereby controlling the input unit U1, the motor cylinder unit U2 and the hydraulic pressure control unit U3. Hence, the controller 100 controls the brake hydraulic pressure applied to the wheel cylinders H of the wheel brakes FR, RL, FL and RR, thereby applying an appropriate braking force to each wheel W.

Figure 2:
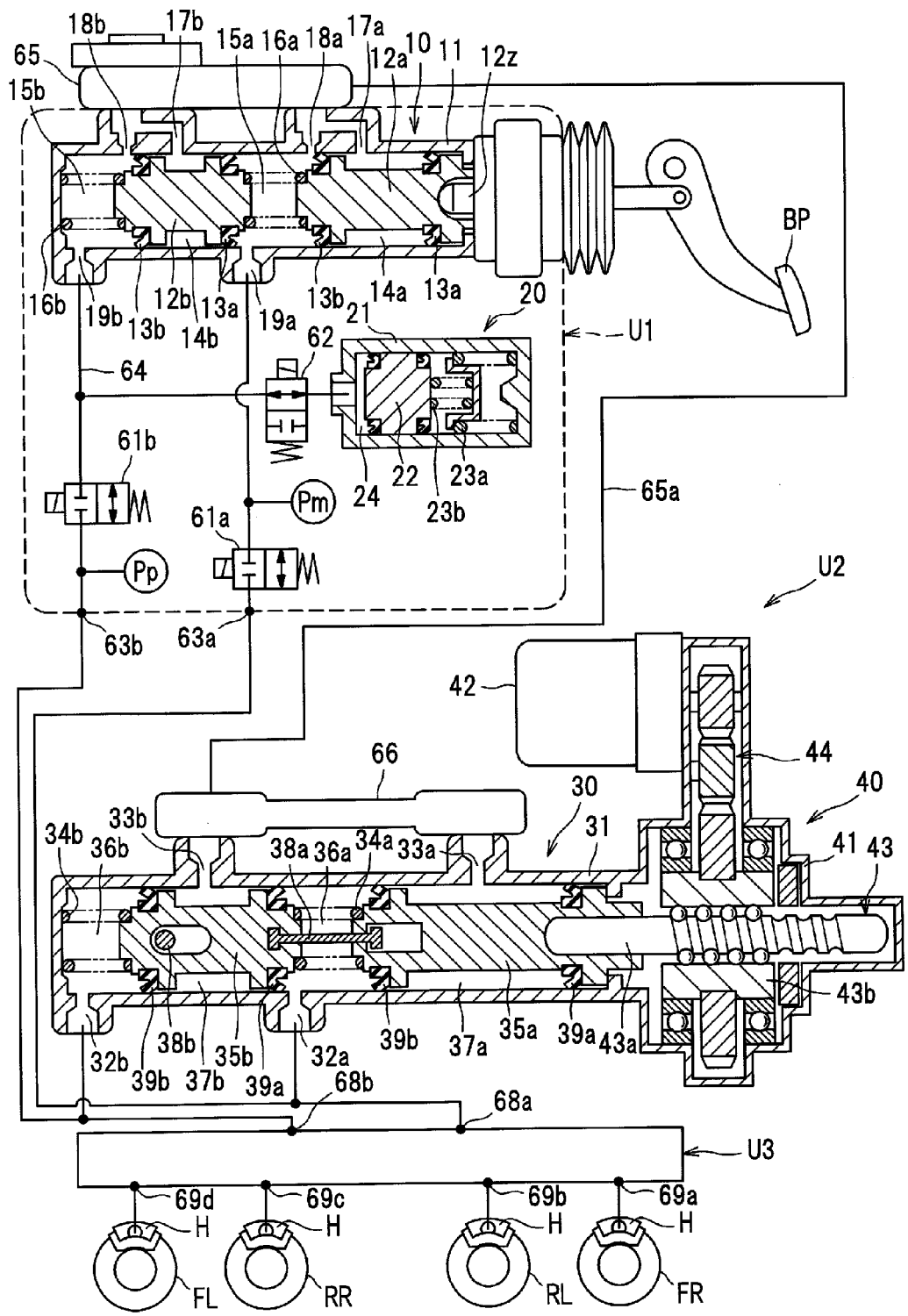
FIG. 2 is a view showing the configurations of the brake hydraulic pressure circuits of an input unit and a motor cylinder unit.

As shown in FIG. 2, the connection port 63a of the first system of the input unit U1 is connected to the output port 32a of the motor cylinder unit U2 and the input port 68a of the hydraulic pressure control unit U3 via pipes. Similarly, the connection port 63b of the second system thereof is connected to the output port 32b of the motor cylinder unit U2 and the input port 68b of the hydraulic pressure control unit U3 via pipes.

The hydraulic pressure control unit U3 is provided with four output ports 69a to 69d to which the wheel cylinders H of the wheel brakes FR, RL, RR and FL are connected respectively.

[Input Unit U1]

The input unit U1 has a tandem master cylinder 10 capable of generating hydraulic pressure by virtue of the driver's operation of the brake pedal BP and a first reservoir 65 attached to the master cylinder 10. Inside the cylinder tube 11 of the master cylinder 10, a first piston 12a and a second piston 12b are disposed so as to be separated at a predetermined distance therebetween in the axial direction of the cylinder tube 11 and so as to be slidable. The first piston 12a is disposed close to the brake pedal BP and is connected to the brake pedal BP via a push rod 12z. The second piston 12b is disposed further away from the brake pedal BP than the first piston 12a.

A pair of piston packings 13a and 13b is mounted respectively on the outer peripheral faces of each of the first piston 12a and the second piston 12b, being separated from each other in the axial direction. Between the pair of the piston packings 13a and 13b, each of back chambers 14a and 14b is formed at a portion in which the diameter of each of the first piston 12a and the second piston 12b is made small. The back chambers 14a and 14b are connected to the first reservoir 65 via supply ports 17a and 17b, respectively.

Between the first piston 12a and the second piston 12b, a first pressure chamber 15a is formed, and the first pressure chamber 15a is connected to the first reservoir 65 via a relief port 18a. Similarly, between the second piston 12b and the side end section of the cylinder tube 11, a second pressure chamber 15b is formed, and the second pressure chamber 15b is connected to the first reservoir 65 via a relief port 18b. When the driver steps on the brake pedal BP, the first pressure chamber 15a and the second pressure chamber 15b generate brake hydraulic pressure corresponding to the stepping force on the brake pedal.

Between the first piston 12a and the second piston 12b, a spring 16a is provided, and between the second piston 12b and the side end section of the cylinder tube 11, a spring 16b is provided. With this configuration, when the driver stops the operation of the brake pedal BP, the volumes of the first pressure chamber 15a and the second pressure chamber 15b can be returned to their appropriate volumes.

In the cylinder tube 11, output ports 19a and 19b are formed so as to correspond to and communicate with the pressure chambers 15a and 15b, respectively. The output ports 19a and 19b are connected to the connection ports 63a and 63b of the input unit U1 via pipes, respectively.

On the pipe connecting the output port 19a of the master cylinder 10 to the connection port 63a of the input unit U1, a normally-open solenoid valve 61a is disposed. On the pipe connecting the output port 19b of the master cylinder 10 to the connection port 63b of the input unit U1, a normally-open solenoid valve 61b is disposed.

To the pipe (branched hydraulic pressure passage 64) connecting the output port 19b of the master cylinder 10 to the normally-open solenoid valve 61b, a stroke simulator 20 is connected via a normally-closed solenoid valve 62.

FIG. 2 shows that the normally-open solenoid valves 61a and 61b have been energized and are in the normal operation state (closed state) and also shows that the normally-closed solenoid valve 62 has been energized and is in the normal operation state (open state).

The stroke simulator 20 is an apparatus for generating the stroke and reaction force of the brake during by-wire control, thereby causing the driver to feel as if he generates a braking force by applying a stepping force. Inside the cylinder 21 thereof, a piston 22 is disposed, and on one side of the piston 22, a hydraulic pressure chamber 24 communicating with the branched hydraulic pressure passage 64 via the normally-closed solenoid valve 62 is formed. The hydraulic pressure chamber 24 can absorb the brake fluid discharged from the second pressure chamber 15b of the master cylinder 10.

Between the piston 22 and the side end section of the cylinder 21, a first return spring 23a having a high spring constant and a second return spring 23b having a low spring constant are provided in series. With this configuration, the stroke simulator 20 is set so that the incremental gradient of the reaction force of the pedal is low at the early stage of the stepping on the brake pedal BP and so that the incremental gradient of the reaction force is high at the later stage of the stepping. For this reason, the pedal feeling of the brake pedal BP is made equivalent to that in the existing master cylinder.

On the hydraulic passage connecting the output port 19a of the master cylinder 10 to the normally-open solenoid valve 61a, a first hydraulic pressure sensor Pm is disposed, and on the hydraulic passage connecting the normally-open solenoid valve 61b to the connection port 63b, a second hydraulic pressure sensor Pp is disposed. The first hydraulic pressure sensor Pm is used to measure the hydraulic pressure on the master cylinder 10 side of the normally-open solenoid valve 61a that is closed during normal operation, and the second hydraulic pressure sensor Pp is used to measure the hydraulic pressure on the connection port 63b side (on the side of the hydraulic pressure control unit U3) of the normally-open solenoid valve 61b that is closed during normal operation. The output values of these sensors are output to the controller 100.

[Motor Cylinder Unit U2]

The motor cylinder unit U2 has an actuator mechanism 40 including the electric motor 42 and a cylinder mechanism 30 operated by the actuator mechanism 40.

The actuator mechanism 40 has an actuator housing 41, and the actuator housing 41 accommodates a ball screw mechanism 43 including a screw shaft 43a and a nut 43b and also accommodates a reduction gear train 44 for transmitting the rotation operation of the electric motor 42 to the nut 43b. The screw shaft 43a is connected to a first slave piston 35a.

The cylinder mechanism 30 has a cylinder body 31 and a second reservoir 66 attached to the cylinder body 31. The second reservoir 66 is connected to the first reservoir 65 via a pipe 65a. Inside the cylinder body 31, the first slave piston 35a and a second slave piston 35b are disposed so as to be separated at a predetermined distance therebetween in the axial direction of the cylinder body 31 and so as to be slidable. The first slave piston 35a is disposed close to the side of the ball screw mechanism 43, makes contact with one end section of the screw shaft 43a, and is displaceable integrally with the screw shaft 43a in the longitudinal direction of the cylinder body 31. The second slave piston 35b is disposed further away from the ball screw mechanism 43 than the first slave piston 35a.

A pair of slave piston packings 39a and 39b is mounted respectively on the outer peripheral faces of each of the first slave piston 35a and the second slave piston 35b, being separated from each other in the axial direction. Between the pair of the slave piston packings 39a and 39b, each of first and second back chambers 37a and 37b is formed at a portion in which the diameter of each of the first slave piston 35a and the second slave piston 35b is made small. The first and second back chambers 37a and 37b are connected to the second reservoir 66 via reservoir ports 33a and 33b, respectively.

Between the first slave piston 35a and the second slave piston 35b, a first hydraulic pressure chamber 36a is formed, and between the second slave piston 35b and the side end section of the cylinder body 31, a second hydraulic pressure chamber 36b is formed. In addition, in the cylinder body 31, the output ports 32a and 32b are formed so as to correspond to and communicate with the first hydraulic pressure chamber 36a and the second hydraulic pressure chamber 36b, respectively. The output ports 32a and 32b are connected to the connection ports 63a and 63b of the input unit U1 and to the input ports 68a and 68b of the hydraulic pressure control unit U3, respectively. When the screw shaft 43a is moved toward the first slave piston 35a by the operation of the electric motor 42, the first hydraulic pressure chamber 36a and the second hydraulic pressure chamber 36b generate hydraulic pressure and this pressure is supplied to the hydraulic pressure control unit U3 via the output ports 32a and 32b.

Between the first slave piston 35a and the second slave piston 35b, a spring 34a is provided, and between the second slave piston 35b and the side end section of the cylinder body 31, a spring 34b is provided. With this configuration, when the screw shaft 43a is moved to the opposite side of the first slave piston 35a by the operation of the electric motor 42, the volumes of the first hydraulic pressure chamber 36a and the second hydraulic pressure chamber 36b can be returned to their appropriate volumes.

Between the first slave piston 35a and the second slave piston 35b, a restriction link 38a is provided to restrict the maximum strokes (maximum displacement distances) and the minimum strokes (minimum displacement distances) of the first slave piston 35a and the second slave piston 35b, and the second slave piston 35b is provided with a stopper pin 38b to restrict the sliding range of the second slave piston 35b and thereby to prevent the second slave piston 35b from excessively returning to the side of the first slave piston 35a.

[Hydraulic Pressure Control Unit U3]

Figure 3:
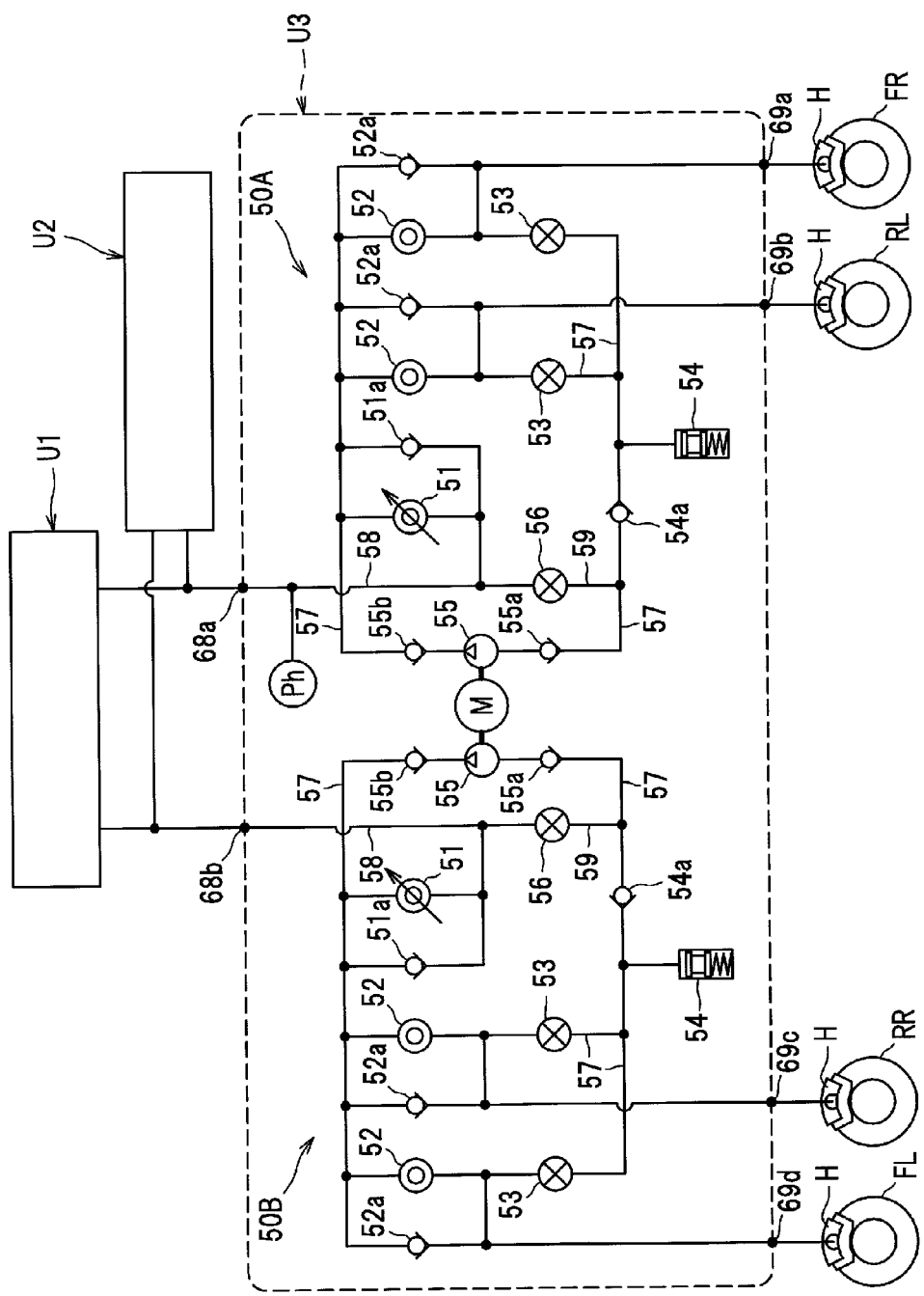
FIG. 3 is a view showing the configuration of the brake hydraulic pressure circuit of a hydraulic pressure control unit.

As shown in FIG. 3, the hydraulic pressure control unit U3 is composed of known components and has a first hydraulic pressure system 50A for controlling the wheel brakes FR and RL and a second hydraulic pressure system 50B for controlling the wheel brakes FL and RR. Since the first hydraulic pressure system 50A and the second hydraulic pressure system 50B have similar configurations, only the first hydraulic pressure system 50A is herein described and the description of the second hydraulic pressure system 50B is omitted.

In the first hydraulic pressure system 50A, a pressure regulating valve 51 formed of a normally-open proportional solenoid valve and capable of adjusting the difference between the hydraulic pressure on the upstream side and the hydraulic pressure on the downstream side depending on the electric current supplied thereto is provided on the hydraulic pressure passage for connecting the input port 68a to the output ports 69a and 69b. A check valve 51a for allowing only the flow of the brake fluid toward the output ports 69a and 69b is disposed in parallel with the pressure regulating valve 51.

The hydraulic pressure passage on the sides of the wheel brakes RL and FR away from the pressure regulating valve 51 is branched in the middle, and the branches are connected to the output port 69a and the output port 69b, respectively. Inlet valves 52, each formed of a normally-open solenoid valve, are disposed on the hydraulic pressure passages corresponding to the output ports 69a and 69b. A check valve 52a for allowing only the flow of the brake fluid toward the pressure regulating valve 51 is disposed in parallel with each inlet valve 52.

From each of the hydraulic pressure passage between the output port 69a and the inlet valve 52 corresponding thereto and the hydraulic pressure passage between the output port 69b and the inlet valve 52 corresponding thereto, a recirculation hydraulic pressure passage 57 is provided so as to be connected between the pressure regulating valve 51 and the inlet valve 52 via an outlet valve 53 formed of a normally-closed solenoid valve.

On this recirculation hydraulic pressure passage 57, a reservoir 54 for temporarily absorbing excessive brake fluid, a check valve 54a, a check valve 55a, a pump 55 and a check valve 55b are arranged in this order from the side of the outlet valve 53. The check valves 54a, 55a and 55b are all disposed so as to allow only the flow of the brake fluid toward the passage between the pressure regulating valve 51 and the inlet valve 52. The pump 55 is driven by a motor M and provided to generate pressure toward the passage between the pressure regulating valve 51 and the inlet valve 52.

The introduction hydraulic pressure passage 58 for connecting the input port 68a to the pressure regulating valve 51 is connected to the portion of the recirculation hydraulic pressure passage 57 between the check valve 54a and the check valve 55a by a suction hydraulic pressure passage 59 via a suction valve 56 formed of a normally-closed solenoid valve.

A third hydraulic pressure sensor Ph is provided for the introduction hydraulic pressure passage 58 only in the first hydraulic pressure system 50A. The output value of the third hydraulic pressure sensor Ph is output to the controller 100.

In the hydraulic pressure control unit U3 configured as described above, the respective solenoid valves are not energized usually. The brake fluid introduced from the input port 68a passes through the pressure regulating valve 51 and the inlet valves 52 and is output to the output ports 69a and 69b, thereby being directly supplied to the respective wheel cylinders H. In the case of reducing excessive brake hydraulic pressure in the wheel cylinder H to perform antilock brake control, the corresponding inlet valve 52 is closed and the corresponding outlet valve 53 is opened. Hence, the brake fluid is allowed to flow to the reservoir 54 via the recirculation hydraulic pressure passage 57, whereby the brake fluid in the wheel cylinder H can be extracted. In the case of performing the pressurization of the wheel cylinder H while the brake pedal BP is not operated by the driver, the suction valve 56 is opened and the motor M is driven, whereby the brake fluid can be supplied to the wheel cylinder H positively by the pressurization force of the pump 55. In the case that the degree of the pressurization of the wheel cylinder H is desired to be adjusted, the adjustment can be made by supplying an appropriate electric current to the pressure regulating valve 51.

Next, the details of the controller 100 will be described below.

Figure 4:
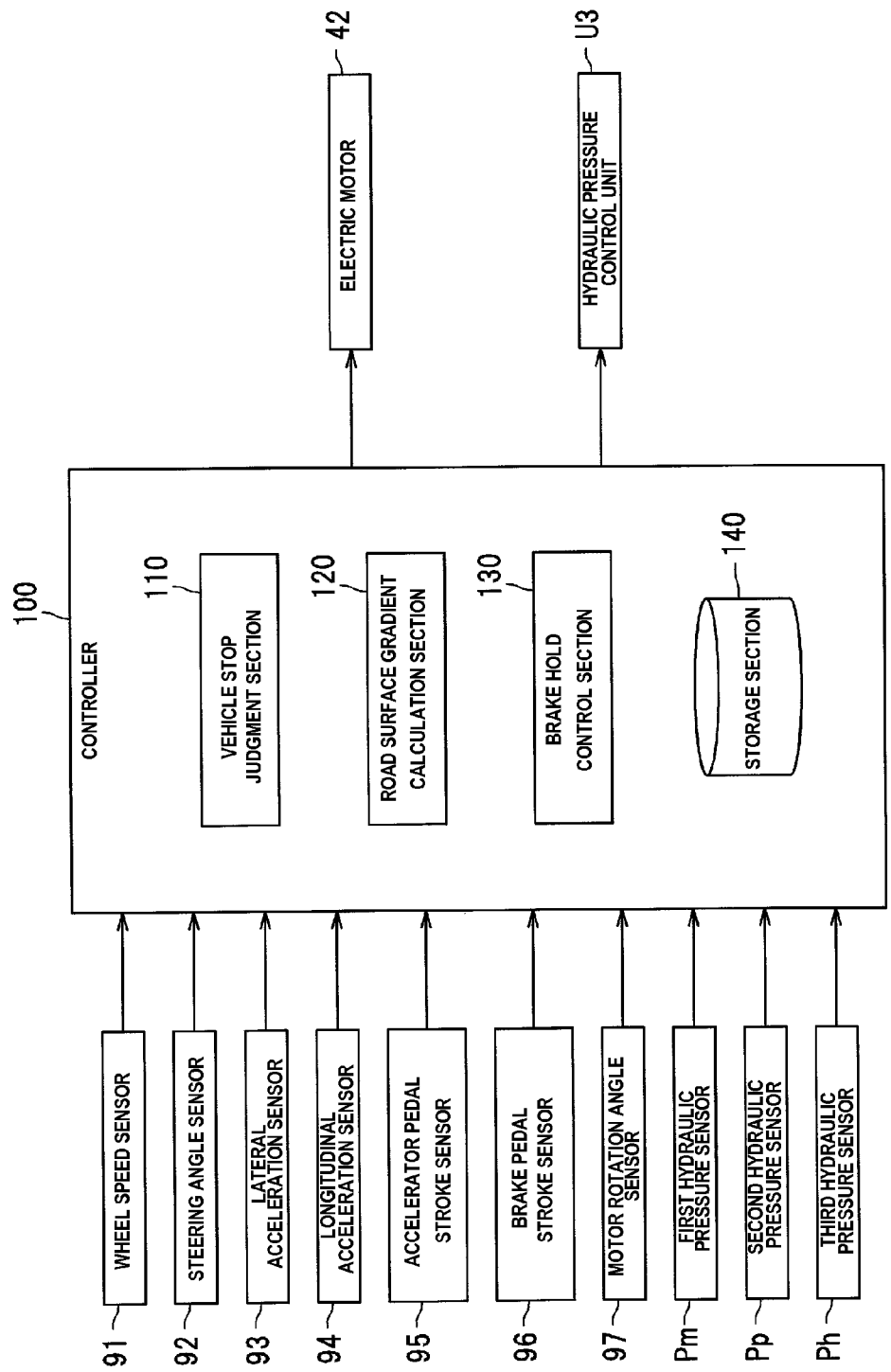
FIG. 4 is a block diagram showing the configuration of the controller.

As shown in FIG. 4, the controller 100 is configured so as to carry out not only known various controls, such as by-wire brake control and ABS (antilock brake system) control but also vehicle holding control for holding the brake hydraulic pressure applied to the wheels during the stop of the vehicle on the basis of signals input from the respective sensors.

The controller 100 is equipped with a vehicle stop judgment section 110, a road surface gradient calculation section 120 serving as an example of a road surface gradient estimator, a brake hold control section 130 serving as an example of a vehicle holding controller, and a storage section 140 serving as an example of a setting storage.

The vehicle stop judgment section 110 has a known function of performing a vehicle stop judgment. In the case that the vehicle stop judgment section 110 judges that a vehicle has stopped, the judgment section outputs a vehicle stop signal indicating the stop of the vehicle to the brake hold control section 130. The vehicle stop judgment may merely be made, for example, by judging whether the vehicle body speed calculated on the basis of the signal from the wheel speed sensor 91 has reached a predetermined value or less.

The road surface gradient calculation section 120 has a function of calculating (estimating) the gradient of a road surface on the basis of the signal from the longitudinal acceleration sensor 94. The road surface gradient calculation section 120 calculates the road surface gradient as a plus value in the case that the longitudinal acceleration applied to the vehicle being in the stop state is the acceleration toward the rear side (in the case that the attitude of the vehicle is forward ascending) and calculates the road surface gradient as a minus value in the case that the longitudinal acceleration is the acceleration toward the front side (in the case that the attitude of the vehicle is a forward descending). The road surface gradient calculation section 120 outputs the calculated road surface gradient to the brake hold control section 130. The road surface gradient calculation section 120 may be configured so that, for example, the value obtained by filter processing the acceleration detected using the longitudinal acceleration sensor 94 is used as the road surface gradient.

The storage section 140 stores (sets) threshold values, maps, calculation formulae, etc. for use in the vehicle holding control, such as a predetermined hydraulic pressure P1, a map showing the relationship between a vehicle stop optimum holding pressure PH and a road surface gradient Hr, and a minimum pressurization target pressure Ps. The hydraulic pressure P1 is herein a threshold value for judging the brake operation amount at the start time of the vehicle holding control and has been set through experiments, simulations, etc. as necessary.

The vehicle stop optimum holding pressure PH is hydraulic pressure that is applied so that a vehicle having zero driving torque is stopped with a necessary minimum braking force, and has been set depending on the road surface gradient Hr through experiments, simulations, etc. The minimum pressurization target pressure Ps is the lower limit value of a pressurization target pressure Pd, that is, a value at which the influence of disturbance (vibration or the like) to a vehicle stopping on a flat road is excluded. The target pressure has been set as a constant value through experiments, simulations, etc.

The brake hold control section 130 has a function of carrying out the vehicle holding control for holding the brake hydraulic pressure applied to the wheels during the stop of the vehicle. Upon receiving a stop signal from the vehicle stop judgment section 110, the brake hold control section 130 starts the vehicle holding control.

The brake hold control section 130 is configured so as to carry out holding control for holding the brake hydraulic pressure applied to the wheels W and pressurization control for raising the brake hydraulic pressure applied to the wheels W in the vehicle holding control. At the start time of the vehicle holding control, the brake hold control section 130 judges whether a control request hydraulic pressure (actual-pressure-equivalent hydraulic pressure) Pr is not more than the predetermined hydraulic pressure P1. The brake hold control section 130 carries out pressurization control by driving the electric motor 42 forward in the case that the control request hydraulic pressure Pr is not more than the predetermined hydraulic pressure P1 and holds (maintains) the rotation stop state of the electric motor 42 in the case that the control request hydraulic pressure Pr is more than the predetermined hydraulic pressure P1, thereby carrying out the holding control.

The control request hydraulic pressure Pr is herein the target value of the brake hydraulic pressure of one subsequent control cycle and the brake hydraulic pressure applied to the wheels W during the vehicle holding control is nearly equal to the control request hydraulic pressure Pr. At the start time of the vehicle holding control, the control request hydraulic pressure Pr is set to the same value as the start time value of the brake hydraulic pressure. In the case that the holding control is carried out thereafter, the same value is maintained without being changed. The start time brake hydraulic pressure for the vehicle holding control may merely be estimated from, for example, the hydraulic pressure detected by the third hydraulic pressure sensor Ph and the operation history of each component of the hydraulic pressure control unit U3.

In the case that the pressurization control is carried out at the start time of the vehicle holding control, the control request hydraulic pressure Pr is set as the latest target value to which the brake hydraulic pressure is raised from the present brake hydraulic pressure to the pressurization target pressure Pd at a constant upward gradient. In other words, the control request hydraulic pressure Pr is set to the total value of the present brake hydraulic pressure and the hydraulic pressure incremental amount per unit time corresponding to the upward gradient.

In the case of carrying out the pressurization control, the brake hold control section 130 is configured so as to set the pressurization target pressure Pd using driving torque T only at the start time of the vehicle holding control and to raise the brake hydraulic pressure at the preset constant incremental gradient to the pressurization target pressure Pd. In other words, in the case of carrying out the pressurization control, the brake hold control section 130 sets the pressurization target pressure Pd using the driving torque T only at the start time of the vehicle holding control, and thereafter sets (corrects) the pressurization target pressure Pd without using the driving torque T.

Since the pressurization target pressure Pd is set using the driving torque T only at the start time of the vehicle holding control, the vehicle holding control can be made simple. In addition, since the brake hydraulic pressure is raised at the preset constant incremental gradient in the pressurization control, the influence of rolling-back (shock) to the vehicle at the time when the pressurization control is ended (when the pressurization control is switched to the holding control) is suppressed, and an excellent pressurization feeling can be obtained.

The driving torque T may be a signal relating to the driving torque obtained using an on-vehicle network or may be a signal from a sensor for detecting the driving torque.

The brake hold control section 130 is configured so as to correct the pressurization target pressure Pd on the basis of the road surface gradient Hr calculated by the road gradient calculation section 120. With this configuration, since the pressurization target pressure Pd suited for the road surface gradient Hr can be set, the vehicle can be held better.

The brake hold control section 130 is configured so as to correct the pressurization target pressure Pd under the condition that the longitudinal acceleration output from the longitudinal acceleration sensor 94 has been stabilized. With this configuration, since the road surface gradient Hr can be calculated accurately using the stabilized longitudinal acceleration, an optimum pressurization target pressure Pd can be set using the accurate road surface gradient Hr. The judgment as to whether the longitudinal acceleration has been stabilized can be made by judging, for example, whether the condition that the change amount of the longitudinal acceleration per unit time output from the longitudinal acceleration sensor 94 has been not more than a predetermined value is satisfied continuously for a predetermined time.

The brake hold control section 130 calculates the above-mentioned vehicle stop optimum holding pressure PH on the basis of the road surface gradient Hr calculated by the road gradient calculation section 120 in the state in which the pressurization control is carried out. In this embodiment, it is assumed that the calculation of the vehicle stop optimum holding pressure PH is performed on the basis of the map stored in the above-mentioned storage section 140. However, the present invention is not limited to this method, but the calculation may be performed, for example, using a calculation formula or the like.

Then, the brake hold control section 130 judges whether the control request hydraulic pressure Pr is larger than the vehicle stop optimum holding pressure PH. In the case that the control request hydraulic pressure Pr is larger, the brake hold control section 130 sets the pressurization target pressure Pd to the control request hydraulic pressure Pr. In the case that the control request hydraulic pressure Pr is larger than the vehicle stop optimum holding pressure PH as described above, that is, in the case that the brake hydraulic pressure (nearly equal to the control request hydraulic pressure Pr) at that time is sufficient to be able to stop the vehicle, the brake hold control section 130 sets the pressurization target pressure Pd to the control request hydraulic pressure Pr, whereby the pressurization control can be ended promptly and the holding pressure can be suppressed from becoming excessively high.

In the case that the pressurization target pressure Pd is smaller than the above-mentioned minimum pressurization target pressure Ps, the brake hold control section 130 sets the pressurization target pressure Pd to the minimum pressurization target pressure Ps. With this setting, even in the case that, for example, the pressurization target pressure Pd has been set to a very low value, the pressurization target pressure Pd is changed to the minimum pressurization target pressure Ps that is larger than the very low value. Hence, the influence of disturbance (vibration or the like) can be suppressed by the minimum pressurization target pressure Ps, whereby the vehicle can be held better.

Next, the operation of the controller 100 will be described below in detail referring to FIGS. 5 and 6.

Figure 5:
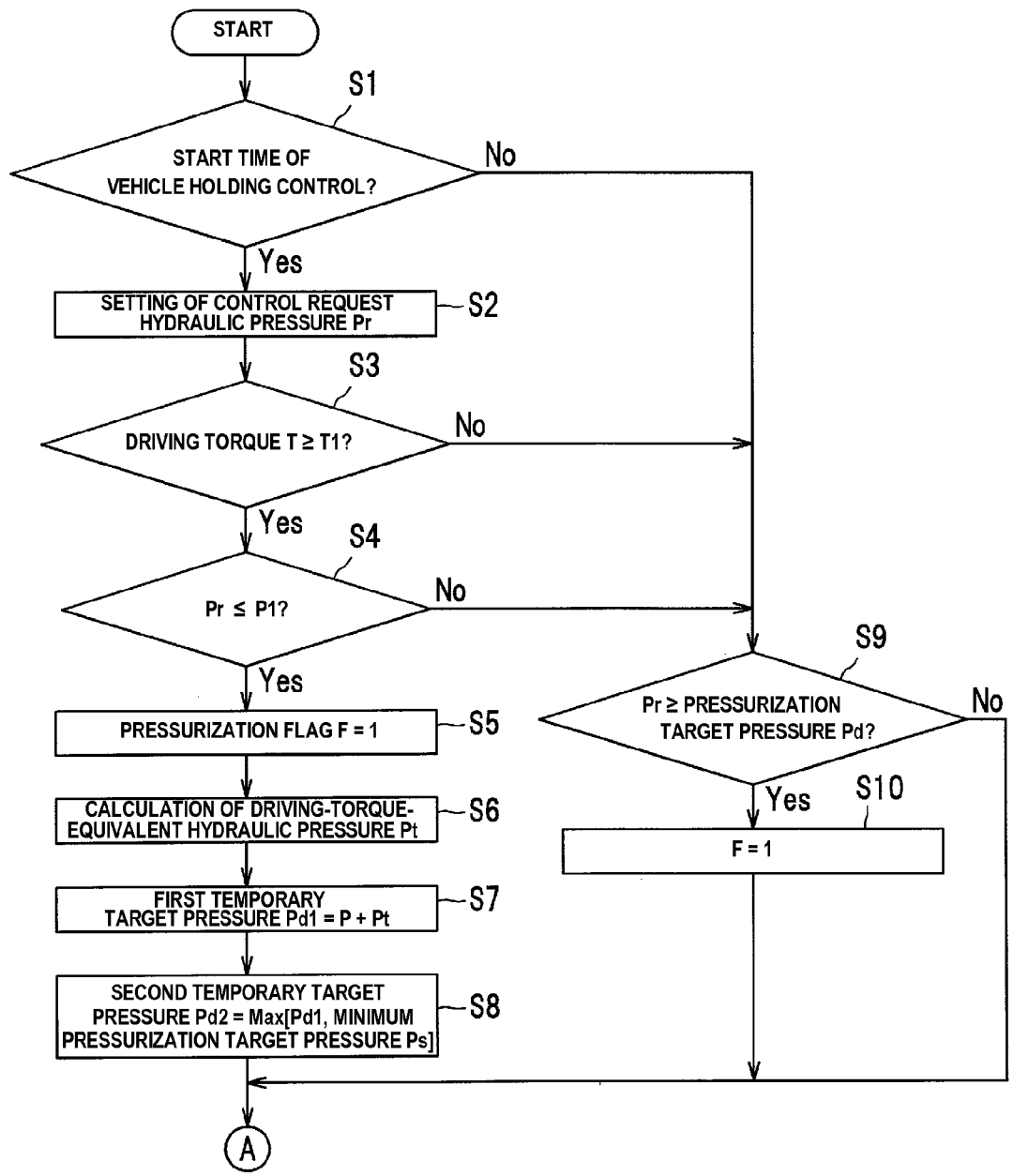
FIG. 5 is a flow chart showing the first half portion of the operation of the controller.
Figure 6:
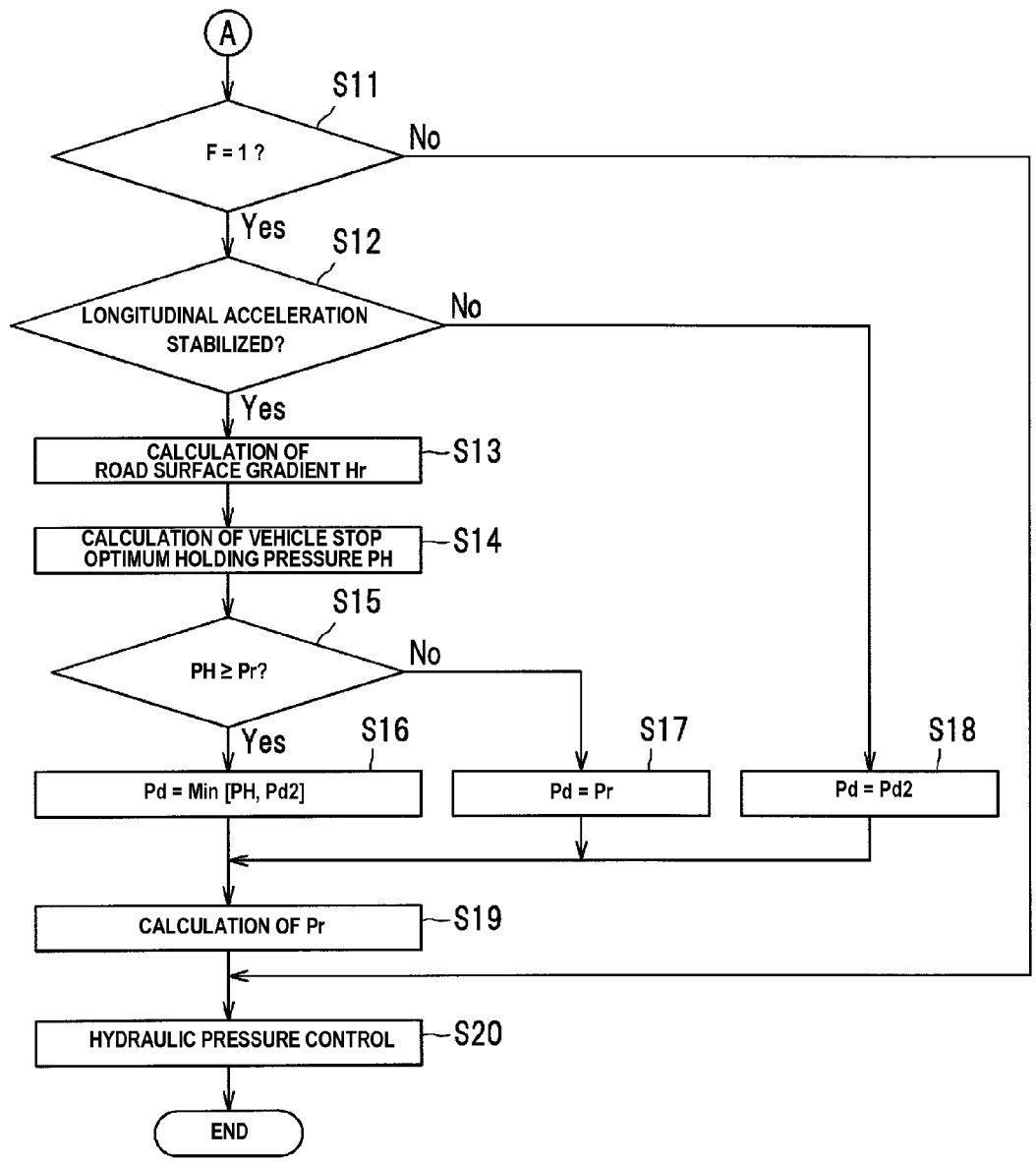
FIG. 6 is a flow chart showing the latter half portion of the operation of the controller.

When the vehicle holding control starts, the controller 100 carries out control according to the flow charts shown in FIGS. 5 and 6 and ends the control when vehicle holding control ending conditions are satisfied. The vehicle holding control ending conditions may be known conditions, for example, a condition that the accelerator pedal has been stepped on.

As shown in FIG. 5, in the case that the vehicle stop judgment section 110 judges that the vehicle has stopped, the controller 100 starts the vehicle holding control (START) and judges whether the present time is the start time of the vehicle holding control (at S1). The judgment as to whether the present time is the start time may merely be made by judging whether the previous value of the flag for use in the vehicle stop judgment is 0 and the present value of the flag is 1.

In the case that the controller 100 judges that the present time is the start time of the vehicle holding control at step S1 (Yes), the controller 100 sets the present brake hydraulic pressure as the control request hydraulic pressure Pr (at S2). After step S2, the controller 100 judges whether the driving torque T applied to the wheels W is not less than a predetermined value T1 (at S3).

Upon judging that the driving torque T is not less than the predetermined value T1 at step S3 (Yes), the controller 100 judges whether the control request hydraulic pressure Pr is not more than the predetermined hydraulic pressure P1 (at S4). Upon judging that the control request hydraulic pressure Pr is not more than the predetermined hydraulic pressure P1 at step S4 (Yes), the controller 100 sets a pressurization flag F to 1 (at S5).

After step S5, the controller 100 calculates a hydraulic pressure Pt equivalent to driving torque on the basis of the driving torque T (at S6). The driving-torque-equivalent hydraulic pressure Pt is herein hydraulic pressure for suppressing the vehicle from moving due to the reduction of the driving torque T and is set in correspondence with the driving torque T through experiments, simulations, etc. The calculation of the driving-torque-equivalent hydraulic pressure Pt may merely be made by using a map, a calculation formula, etc. showing the relationship between the driving torque T and the driving-torque-equivalent hydraulic pressure Pt. After step S6, the controller 100 calculates a first temporary target pressure Pd1 on the basis of the following calculation formula (1) (at S7).

$$Pd1 = P + Pt \qquad (1)$$

Pd1: first temporary target pressure
P: present brake hydraulic pressure
Pt: driving-torque-equivalent hydraulic pressure equivalent After step S7, the controller 100 calculates a second temporary target pressure Pd2 on the basis of the following calculation formula (2) (at S8). In other words, the controller 100 sets the first temporary target pressure Pd1 or the minimum pressurization target pressure Ps, whichever larger, as the second temporary target pressure Pd2 at step S8.

$$Pd2 = \mathrm{Max}[Pd1, Ps] \qquad (2)$$

Pd2: second temporary target pressure
Pd1: first temporary target pressure
Ps: minimum pressurization target pressure In the case that the controller 100 judged No at steps S1, S3 and S4, the controller 100 judges whether the control request hydraulic pressure Pr is not less than the pressurization target pressure Pd (at S9). In the case that the controller 100 judges that the control request hydraulic pressure Pr is not less than the pressurization target pressure Pd at S9 (Yes), the controller 100 sets the pressurization flag F to 0 (at S10). In the case that the judgment at step S1 is No, that is, in the case that the present time is not the start time of the vehicle holding control, the pressurization target pressure Pd at step S9 has a value set at step S16, step S17 or step S18.

In the case that the judgment at step S3 or step S4 is No, that is, in the case that the present time is the start time of the vehicle holding control, the pressurization target pressure Pd at step S9 has a preset initial value. This initial value can be set to a very small value, for example, 0. With this setting, in the case that the vehicle holding control is ended in a state in which the pressurization flag F is 1, even if the judgment at step S3 or step S4 is No at the start time of the next vehicle holding control, the pressurization flag F can be set to 0 at step S10. Hence, in the case that the holding control is desired to be carried out at the start time of the vehicle holding control, the holding control can be carried out surely.

After step S8, after step S10 or after a judgment of No at step S9, the controller 100 judges whether the pressurization flag F is 1 as shown in FIG. 6 (at S11). In the case that the controller 100 judges that the pressurization flag F is 1 at step S11 (Yes), the controller 100 judges whether the output value of the longitudinal acceleration output from the longitudinal acceleration sensor 94 has been stabilized (at S12).

In the case that the controller 100 judges that the longitudinal acceleration has been stabilized at step S12 (Yes), the controller 100 calculates the road surface gradient Hr on the basis of the stabilized longitudinal acceleration (at S13) and calculates the vehicle stop optimum holding pressure PH (at S14) on the basis of the calculated road surface gradient Hr. After step S14, the controller 100 judges whether the vehicle stop optimum holding pressure PH is not less than the control request hydraulic pressure Pr (at S15).

Upon judging that the vehicle stop optimum holding pressure PH is not less than the control request hydraulic pressure Pr at step S15 (Yes), the controller 100 calculates the pressurization target pressure Pd on the basis of the following calculation formula (3) (at S16). In other words, the controller 100 sets the vehicle stop optimum holding pressure PH or the second temporary target pressure Pd2, whichever smaller, as the pressurization target pressure Pd at step S16.

$$Pd=\text{Min}[PH,Pd2] \quad (3)$$

Pd: pressurization target pressure
PH: vehicle stop optimum holding pressure
Pd2: second temporary target pressure Since the controller 100 sets the vehicle stop optimum holding pressure PH or the second temporary target pressure Pd2, whichever smaller, as the pressurization target pressure Pd at step S16 as described above, wasteful pressurization can be suppressed in the pressurization control.

Upon judging that the control request hydraulic pressure Pr is larger than the vehicle stop optimum holding pressure PH at step S15 (No), the controller 100 sets the pressurization target pressure Pd to the control request hydraulic pressure Pr (at S17). With this setting, the pressurization control can be ended promptly as described above, whereby the holding hydraulic pressure can be suppressed from rising excessively high.

Upon judging that the longitudinal acceleration has not been stabilized at step S12 (No), the controller 100 sets the pressurization target pressure Pd to the second temporary target pressure Pd2 (at S18). After steps S16, S17 and S18, the controller 100 calculates the next control request hydraulic pressure Pr on the basis of the pressurization target pressure Pd, the present control request hydraulic pressure Pr and the above-mentioned incremental gradient (at S19).

The controller 100 judges whether the pressurization target pressure Pd is larger than the present control request hydraulic pressure Pr at step S19. In the case that the pressurization target pressure Pd is larger, the controller 100 adds the present control request hydraulic pressure Pr to the hydraulic pressure incremental amount per unit time corresponding to the incremental gradient, thereby calculating the next control request hydraulic pressure Pr. In the case that the pressurization target pressure Pd is not more than the present control request hydraulic pressure Pr, the controller 100 sets the next control request hydraulic pressure Pr to the present control request hydraulic pressure Pr.

After step S19, the controller 100 controls the electric motor 42 on the basis of the control request hydraulic pressure Pr having been set at step S19 to carry out the holding control or the pressurization control (at S20). In the case that the control request hydraulic pressure Pr having been set at step S19 is equal to the previous control request hydraulic pressure Pr, the controller 100 holds (maintains) the rotation stop state of the electric motor 42, thereby carrying out the holding control at step S20. In the case that the control request hydraulic pressure Pr having been set at step S19 is larger than the previous control request hydraulic pressure Pr, the controller 100 drives the electric motor 42 according to the driving amount equivalent to the hydraulic pressure incremental amount equivalent to the difference in hydraulic pressure, thereby carrying out the pressurization control.

Still further, upon judging that the pressurization flag F is not 1 at step S11 (No), the control of the controller 100 also advances to step S20.

Next, some examples of the vehicle holding control in the case that a vehicle has stopped on a flat road having a road surface gradient of less than a predetermined value will be described below in detail referred to FIGS. 7A to 9F. FIGS. 7A to 7F show Example 1 in which the pressurization target pressure Pd is set to the control request hydraulic pressure Pr after the stabilization of the longitudinal acceleration. FIGS. 8A to 8F show Example 2 in which the pressurization target pressure Pd is set to the vehicle stop optimum holding pressure PH after the stabilization of the longitudinal acceleration. FIGS. 9A to 9F show Example 3 in which the pressurization target pressure Pd is set to the minimum pressurization target pressure Ps both at the start time of the vehicle holding control and after the stabilization of the longitudinal acceleration.

In each figure, the judgment as to whether the longitudinal acceleration has been stabilized is indicated using a flag. It is assumed that the longitudinal acceleration is "stable" in the case that the flag is 1 and "unstable" in the case that the flag is 0. The vehicle stop judgment is also indicated using a flag. It is assumed that the vehicle has "stopped" in the case that the flag is 1 and the vehicle is "traveling" in the case that the flag is 0.

Example 1

Figure 7A:
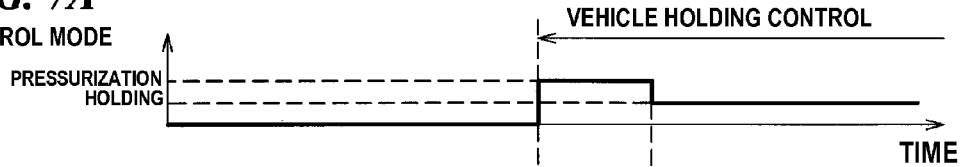
FIGS. 7A to 7F are time charts in Example 1 in which a pressurization target pressure is set to a control request hydraulic pressure after the stabilization of longitudinal acceleration.
Figure 7B:
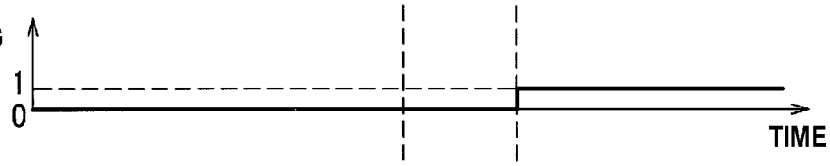
Figure 7C:
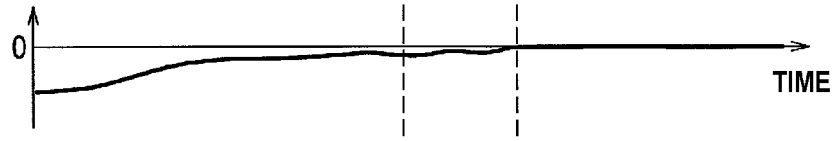
Figure 7D:
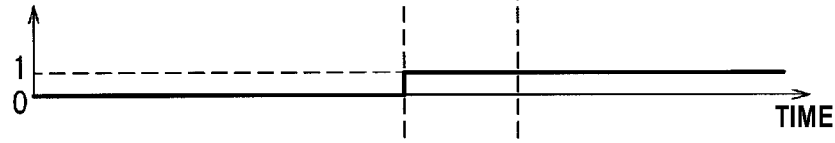
Figure 7E:
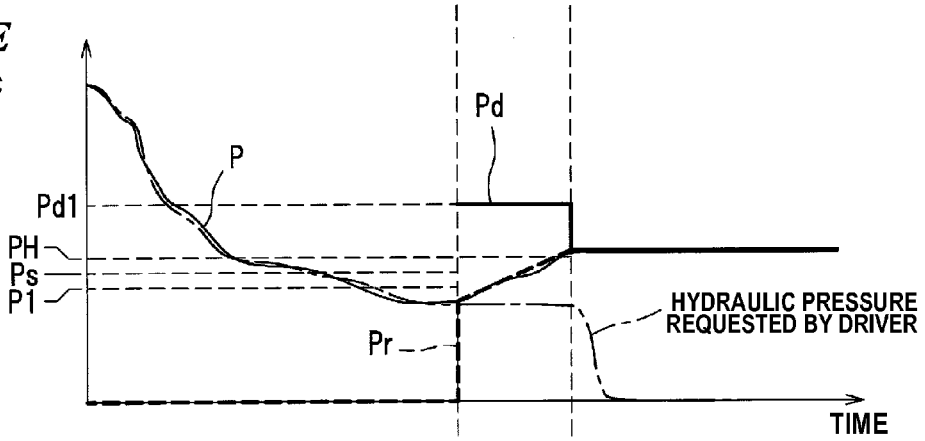
Figure 7F:
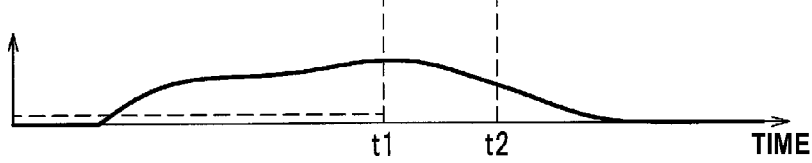

When a vehicle stops (at time t1) as shown in FIG. 7D, the controller 100 starts the vehicle holding control as shown in FIG. 7A. At the start time of the vehicle holding control, the controller 100 judges Yes at step S1 and sets the present brake hydraulic pressure as the control request hydraulic pressure Pr (at S2). In the case that the driving torque T is not less than the predetermined value T1 and that the control request hydraulic pressure Pr is not more than the predetermined hydraulic pressure P1 as shown in FIGS. 7A, 7E and 7F, the controller 100 judges Yes at steps S3 and S4, sets the pressurization flag F to 1 and calculates the driving-torque-equivalent hydraulic pressure Pt (at S5 and S6).

Then, the controller 100 calculates the first temporary target pressure Pd1 at step S7. In the case that the driving torque T has a relatively large value at this time, the first temporary target pressure Pd1 is calculated as a relatively large value.

Then, the controller 100 sets the second temporary target pressure Pd2 to the first temporary target pressure Pd1 or the minimum pressurization target pressure Ps, whichever larger, at step S8. In the case that the first temporary target pressure Pd1 is larger than the minimum pressurization target pressure Ps at this time as shown in the figure, the controller 100 sets the second temporary target pressure Pd2 to the first temporary target pressure Pd1.

Then, the controller 100 judges Yes at step S11. Since the longitudinal acceleration has not yet judged stabilized at the start time of the vehicle holding control, the controller 100 judges No at step S12 and sets the pressurization target pressure Pd to the second temporary target pressure Pd2 (that is, the first temporary target pressure Pd1) (at S18). Hence, as shown in FIG. 7E, the pressurization target pressure Pd has the value obtained by adding the hydraulic pressure equivalent to the driving torque T to the present brake hydraulic pressure P. Then, the controller 100 carries out the processes of steps S19 and S20 and starts the pressurization control.

In the period after the start time of the vehicle holding control and until the longitudinal acceleration is judged stabilized, the controller 100 sequentially repeats the processes of step S1 (No), step S9 (No), step S11 (Yes), step S12 (No), and steps S18, S19 and S20, thereby raising the brake hydraulic pressure P at the constant incremental gradient toward the pressurization target pressure Pd. Hence, the brake hydraulic pressure P becomes higher than the hydraulic pressure requested by the driver (the hydraulic pressure corresponding to the operation amount of the brake).

Then, the controller 100 judges that the condition that the change amount of the longitudinal acceleration per unit time has not been more than the predetermined value is satisfied continuously for the predetermined time in the period between time t1 and time t2 and immediately before time t2 in FIG. 7C, whereby the controller 100 sets the stabilization flag from 0 to 1. Upon judging that the longitudinal acceleration has been stabilized, the controller 100 judges Yes at step S12 and then carries out the processes of steps S13 to S15, thereby calculating the road surface gradient Hr and the vehicle stop optimum holding pressure PH and judging whether the calculated vehicle stop optimum holding pressure PH is not less than the control request hydraulic pressure Pr. In the case that the control request hydraulic pressure Pr is larger than the vehicle stop optimum holding pressure PH as shown in FIG. 7E at this time (No at S15), the controller 100 sets the pressurization target pressure Pd to the present control request hydraulic pressure Pr (at S17).

Then, the controller 100 performs the processes of steps S19 and S20, thereby carrying out the holding control (refer to FIG. 7A). Then, the controller 100 judges No at step S1, judges Yes at step S9, and sets the pressurization flag F to 0 (at S10). Hence, the judgment at step S11 is No, and the holding control continues at step S20.

Example 2

In Example 2, the timing at which the longitudinal acceleration is stabilized is made earlier than that in Example 1, whereby the setting of the pressurization target pressure Pd after the stabilization of the longitudinal acceleration is different from that in Example 1. Only phenomena in Example 2 different from those in Example 1 will be described below.

As shown in FIGS. 8B and 8E, when it is judged by a judgment method similar to that shown in FIGS. 7A to 7F (at time t11) that the longitudinal acceleration has been stabilized and in the case that the vehicle stop optimum holding pressure PH is larger than the control request hydraulic pressure Pr, the controller 100 judges Yes at step S15 and sets the pressurization target pressure Pd to the vehicle stop optimum holding pressure PH or the second temporary target pressure Pd2, whichever smaller (at S16). Since the second temporary target pressure Pd2 has been set to the first temporary target pressure Pd1 in Example 2 as in the case of Example 1, the vehicle stop optimum holding pressure PH smaller than the first temporary target pressure Pd1 is set as the pressurization target pressure Pd.

As a result, the control request hydraulic pressure Pr can be caused to reach the pressurization target pressure Pd (PH) promptly (at time t12) in comparison with, for example, the method in which the pressurization target pressure Pd is maintained at the second temporary target pressure Pd2 (Pd1) even after the stabilization of the longitudinal acceleration, whereby the pressurization control can be ended promptly and wasteful pressurization can be suppressed.

Example 3

Figure 9A:
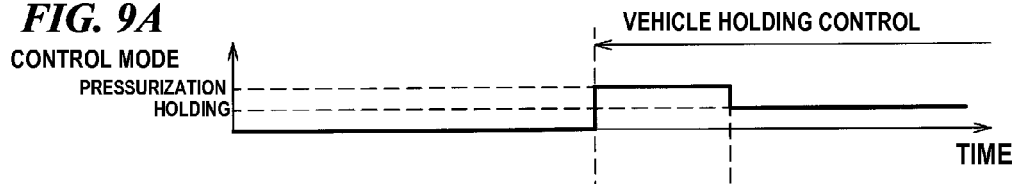
FIGS. 9A to 9F are time charts in Example 3 in which the pressurization target pressure is set to a minimum pressurization target pressure both at the start time of vehicle holding control and after the stabilization of the longitudinal acceleration.
Figure 9B:
Figure 9C:
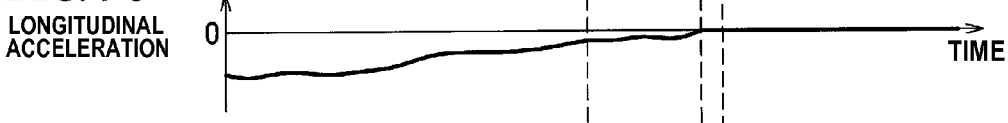
Figure 9D:
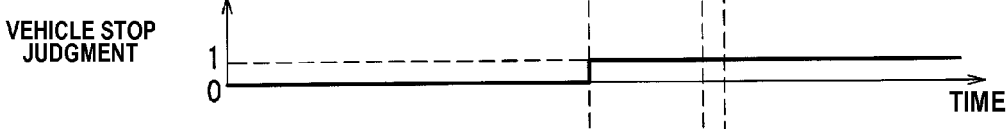
Figure 9E:
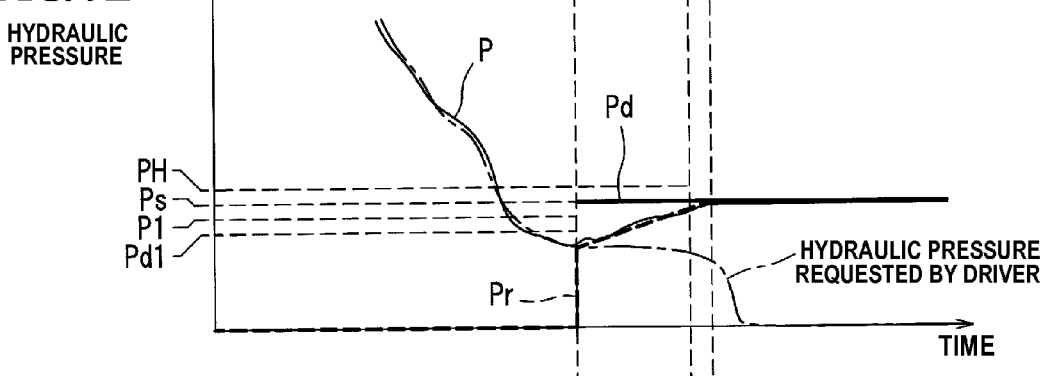
Figure 9F:

When the vehicle stops (at time t21) as shown in FIG. 9D, the controller 100 starts the vehicle holding control as shown in FIG. 9A. At this start time, in the case that the driving torque T is not less than the predetermined value T1 and that the control request hydraulic pressure Pr is not more than the predetermined hydraulic pressure P1 as shown in FIGS. 9E and 9F, the controller 100 performs the processes of step S1 to step S6 sequentially as in the case of Example 1 and calculates the first temporary target pressure Pd1 at step S7. In the case that the driving torque T has a relatively small value at this time as shown in FIG. 9F, the first temporary target pressure Pd1 is calculated as a relatively small value.

Then, the controller 100 sets the second temporary target pressure Pd2 to the first temporary target pressure Pd1 or the minimum pressurization target pressure Ps, whichever larger, at step S8. In the case that the minimum pressurization target pressure Ps is larger than first temporary target pressure Pd1 at this time as shown in FIG. 9E, the controller 100 sets the minimum pressurization target pressure Ps as the second temporary target pressure Pd2.

Then, the controller 100 performs the processes of steps S11, S12 and S18 as in the case of Example 1, thereby setting the pressurization target pressure Pd to the second temporary target pressure Pd2 (that is, the minimum pressurization target pressure Ps). Hence, the brake hydraulic pressure P can be raised toward the target value (the minimum pressurization target pressure Ps) that is larger than the first temporary target pressure Pd1. As a result, the influence of disturbance (vibration or the like) can be suppressed and excellent vehicle holding control can be carried out.

As shown in FIG. 9B, when it is judged that the longitudinal acceleration has been stabilized by a judgment method similar to that shown in FIGS. 7A to 7F (at time t22), the controller 100 performs the processes of steps S12 to S15 as in the case of Example 1. In the case that the vehicle stop optimum holding pressure PH is not less than the control request hydraulic pressure Pr as shown in FIG. 9E, the controller 100 judges Yes at step S15 and sets the pressurization target pressure Pd to the vehicle stop optimum holding pressure PH or the second temporary target pressure Pd2, whichever smaller (at S16).

Since the second temporary target pressure Pd2 has been set to the minimum pressurization target pressure Ps that is smaller than the vehicle stop optimum holding pressure PH in Example 3, the minimum pressurization target pressure Ps remains set as the pressurization target pressure Pd. Then, the controller 100 continues the pressurization control until the control request hydraulic pressure Pr reaches the pressurization target pressure Pd as shown in FIGS. 9A and 9E. When the control request hydraulic pressure Pr reaches the pressurization target pressure Pd (at time t23), the controller 100 performs the holding control.

However, the present invention is not limited to the above-mentioned embodiment, but various embodiments such as those exemplified below can be used.

The control request hydraulic pressure Pr is exemplified as the actual-pressure-equivalent hydraulic pressure in the above-mentioned embodiment.

However, in the present invention, without being limited to this, the actual-pressure-equivalent hydraulic pressure may be, for example, the brake hydraulic pressure actually applied to the wheels.

The brake hydraulic pressure is raised and held by controlling the electric motor 42 in the above-mentioned embodiment. However, in the present invention, without being limited to this, the brake hydraulic pressure may be raised, for example, by driving the motor M of the hydraulic pressure control unit U3, and the brake hydraulic pressure may be held, for example, by controlling the electric current flowing through the pressure regulating valve 51.

The brake system 1 is mounted on a hybrid automobile in the above-mentioned embodiment. However, in the present invention, without being limited to this, the brake system 1 may be mounted on, for example, vehicles equipped with an idling stop function, other than hybrid automobiles.

The minimum pressurization target pressure is set by storing the minimum pressurization target pressure in the storage section 140 in the above-mentioned embodiment. However, in the present invention, without being limited to this, the minimum pressurization target pressure may be, for example, calculated and set.

The invention claimed is:

1. A vehicle brake hydraulic pressure controller to be mounted on a vehicle which is configured so that a driving torque transmitted to wheels during a stop of the vehicle reduces, the vehicle brake hydraulic pressure controller comprising:
a vehicle holding controller configured to carry out a vehicle holding control to hold a brake hydraulic pressure applied to the wheels during the stop of vehicle,
wherein, in the case that an actual-pressure-equivalent hydraulic pressure corresponding to a brake hydraulic pressure actually applied to the wheels is not more than a predetermined hydraulic pressure at a start time of the vehicle holding control, the vehicle holding controller sets a pressurization target pressure using a specific driving torque applied at the start time of the vehicle holding control and carries out a pressurization control to raise the brake hydraulic pressure to the pressurization target pressure.

2. The vehicle brake hydraulic pressure controller of claim 1, further comprising:
a road surface gradient estimator configured to estimate a road surface gradient,
wherein the vehicle holding controller corrects the pressurization target pressure on the basis of the road surface gradient estimated by the road surface gradient estimator.

3. The vehicle brake hydraulic pressure controller of claim 2,
wherein the road surface gradient estimator estimates the road surface gradient on the basis of a longitudinal acceleration, and
the vehicle holding controller corrects the pressurization target pressure under the condition that the longitudinal acceleration has been stabilized.

4. The vehicle brake hydraulic pressure controller of claim 3,
wherein the vehicle holding controller calculates a vehicle stop optimum holding pressure at which the vehicle stops in a state of zero driving torque on the basis of the road surface gradient estimated by the road surface gradient estimator while the pressurization control is carried out and sets the pressurization target pressure to the actual-pressure-equivalent hydraulic pressure in the case that the actual-pressure-equivalent hydraulic pressure is larger than the vehicle stop optimum holding pressure.

5. The vehicle brake hydraulic pressure controller of claim 1, further comprising:
a setting storage configured to store a minimum pressurization target pressure,
wherein the vehicle holding controller sets the pressurization target pressure to the minimum pressurization target pressure in the case that the pressurization target pressure is smaller than the minimum pressurization target pressure.

6. The vehicle brake hydraulic pressure controller of claim 1,
wherein the vehicle holding controller raises the brake hydraulic pressure at a preset constant incremental gradient in the pressurization control.

7. The vehicle brake hydraulic pressure controller of claim 1,
wherein the vehicle holding controller sets a pressurization target pressure using the specific driving torque only at the start time of the vehicle holding control and carries out a pressurization control to raise the brake hydraulic pressure to the pressurization target pressure.

8. The vehicle brake hydraulic pressure controller of claim 7,
wherein after the start time of the vehicle holding control, the vehicle holding controller sets the pressurization target pressure without using the driving torque T.

9. The vehicle brake hydraulic pressure controller of claim 1, wherein
the vehicle holding controller judges whether the actual-pressure-equivalent hydraulic pressure is not more than the predetermined hydraulic pressure, and
the vehicle holding controller carries out pressurization control by driving an electric motor forward in the case that the actual-pressure-equivalent hydraulic pressure is not more than the predetermined hydraulic pressure and maintains a rotation stop state of the electric motor in the case that the actual-pressure-equivalent hydraulic pressure is more than the predetermined hydraulic pressure.

10. The vehicle brake hydraulic pressure controller of claim 1, wherein
the actual-pressure-equivalent hydraulic pressure is a target value of the brake hydraulic pressure of one subsequent control cycle and the brake hydraulic pressure applied to the wheels during the vehicle holding control is nearly equal to the actual-pressure-equivalent hydraulic pressure.

11. The vehicle brake hydraulic pressure controller of claim 10, wherein at the start time of the vehicle holding control, the actual-pressure-equivalent hydraulic pressure is set to a same value as a start time value of the brake hydraulic pressure.

12. The vehicle brake hydraulic pressure controller of claim 11, wherein in a case that the vehicle holding control is carried out thereafter, a same value is maintained without being changed.

13. The vehicle brake hydraulic pressure controller of claim 12, wherein in the case that the pressurization control is carried out at the start time of the vehicle holding control, the actual-pressure-equivalent hydraulic pressure is set as a latest target value to which the brake hydraulic pressure is raised from a present brake hydraulic pressure to the pressurization target pressure at a constant upward gradient.

14. The vehicle brake hydraulic pressure controller of claim 13, wherein, the actual-pressure-equivalent hydraulic pressure is set to a total value of the present brake hydraulic pressure and a hydraulic pressure incremental amount per unit time corresponding to an upward gradient.

15. The vehicle brake hydraulic pressure controller of claim 11, wherein the vehicle holding controller is configured so as to correct the pressurization target pressure on a basis of road surface gradient.

16. The vehicle brake hydraulic pressure controller of claim 15, wherein the vehicle holding controller calculates an optimum holding pressure on the basis of the road surface gradient calculated in a state in which the pressurization control is carried out.

17. The vehicle brake hydraulic pressure controller of claim 16, wherein the vehicle holding controller judges whether the control request hydraulic pressure is larger than a vehicle stop optimum holding pressure, in a case that the control request hydraulic pressure is larger, the vehicle holding controller sets the pressurization target pressure to the actual-pressure-equivalent hydraulic pressure, and in the case that the actual-pressure-equivalent hydraulic pressure is larger than the vehicle stop optimum holding pressure, the vehicle holding controller sets the pressurization target pressure to the actual-pressure-equivalent hydraulic pressure, whereby the pressurization control is ended promptly.

18. The vehicle brake hydraulic pressure controller of claim 16, wherein in a case that the pressurization target pressure is smaller than the minimum pressurization target pressure, the vehicle holding controller sets the pressurization target pressure to a minimum pressurization target pressure.

19. The vehicle brake hydraulic pressure controller of claim 11, wherein the vehicle holding controller is configured so as to correct the pressurization target pressure under a condition that a longitudinal acceleration output from a longitudinal acceleration sensor has been stabilized.

20. The vehicle brake hydraulic pressure controller of claim 19, wherein the judgment as to whether the longitudinal acceleration has been stabilized is made by judging whether a condition that a change amount of the longitudinal acceleration per unit time output from the longitudinal acceleration sensor has been not more than a predetermined value is satisfied continuously for a predetermined time.

* * * * *